US010089069B2

(12) United States Patent
Jeoung (10) Patent No.: US 10,089,069 B2
(45) Date of Patent: Oct. 2, 2018

(54) METHOD FOR CONTROLLING VOICE EMOTICON IN PORTABLE TERMINAL

(71) Applicants: Openvacs Co., Ltd., Seoul (KR); Young Min Jeoung, Gimpo-si (Gyeonggi-do) (KR)

(72) Inventor: Young Min Jeoung, Gimpo-si (KR)

(73) Assignees: OPENVACS CO., LTD (KR); Young Min Jeoung (KR)

( * ) Notice: Subject to any disclaimer, the term of this patent is extended or adjusted under 35 U.S.C. 154(b) by 494 days.

(21) Appl. No.: 14/895,938

(22) PCT Filed: Jun. 3, 2014

(86) PCT No.: PCT/KR2014/004942
§ 371 (c)(1),
(2) Date: Dec. 4, 2015

(87) PCT Pub. No.: WO2014/196790
PCT Pub. Date: Dec. 11, 2014

(65) Prior Publication Data
US 2016/0132292 A1    May 12, 2016

(30) Foreign Application Priority Data

Jun. 7, 2013    (KR) .......................... 10-2013-0065437

(51) Int. Cl.
*G06F 3/0481* (2013.01)
*G06F 3/16* (2006.01)
(Continued)

(52) U.S. Cl.
CPC ............ *G06F 3/167* (2013.01); *G06F 3/0482* (2013.01); *G06F 3/0488* (2013.01); *H04B 1/3827* (2013.01); *H04M 1/7255* (2013.01)

(58) Field of Classification Search
CPC ....................................................... G06F 3/167
(Continued)

(56) References Cited

U.S. PATENT DOCUMENTS 7,817,784 B2 * 10/2010 Wang .................... H04M 3/493
379/201.05
8,244,105 B2 * 8/2012 Verna ................. H04N 21/4147
386/278

(Continued)

FOREIGN PATENT DOCUMENTS

KR    1020050048035 B1    5/2005
KR     100678206 B1       1/2007
(Continued)

OTHER PUBLICATIONS

Apple, "Iphone User Guide", iOS 5.1, released on Mar. 2012, 179 pages.*

(Continued)

*Primary Examiner* — Reza Nabi
(74) *Attorney, Agent, or Firm* — Mendelsohn Dunleavy, P.C.

(57) ABSTRACT

Disclosed is a method for controlling voice emoticons in a portable terminal for providing a recipient portable terminal with various voice files according to the emotions and feelings of the user in place of text-based emoticons, thereby enabling the various voice files to be played and to express rich emotions compared to the existing monotonous and dry TTS-based voice files. The present invention comprises the steps of: displaying a voice emoticon call menu for calling a voice emoticon menu on one area of a touch screen; displaying the voice emoticon menu provided with a voice emoticon list after the voice emoticon call menu is user-selected; and transmitting a voice emoticon user-selected (Continued)

from the voice emoticon list to a recipient portable terminal in place of the voice of the user.

7 Claims, 10 Drawing Sheets

(51) Int. Cl.
| | | |
|---|---|---|
| *H04M 1/725* | (2006.01) | |
| *G06F 3/0482* | (2013.01) | |
| *G06F 3/0488* | (2013.01) | |
| *H04B 1/3827* | (2015.01) | |

(58) Field of Classification Search
USPC .......................................................... 715/227
See application file for complete search history.

(56) References Cited

U.S. PATENT DOCUMENTS

| | | | | |
|---|---|---|---|---|
| 8,614,730 | B2* | 12/2013 | Kim | H04N 7/141 |
| | | | | 348/14.01 |
| 8,903,525 | B2* | 12/2014 | Xu | G11B 27/28 |
| | | | | 700/94 |
| 9,215,419 | B2* | 12/2015 | Rondeau | H04N 7/173 |
| 9,977,579 | B2* | 5/2018 | Yang | G06F 3/04883 |
| 2003/0144903 | A1* | 7/2003 | Brechner | G06Q 10/107 |
| | | | | 705/14.47 |
| 2004/0181340 | A1* | 9/2004 | Smith | G08B 21/10 |
| | | | | 702/3 |
| 2005/0091062 | A1* | 4/2005 | Burges | G06F 17/30743 |
| | | | | 704/273 |
| 2006/0010120 | A1* | 1/2006 | Deguchi | G06F 17/30749 |
| 2008/0060013 | A1* | 3/2008 | Sarukkai | G06F 17/30781 |
| | | | | 725/46 |
| 2008/0086747 | A1* | 4/2008 | Rasanen | H04N 21/4828 |
| | | | | 725/46 |
| 2008/0103906 | A1* | 5/2008 | Singh | G06F 17/30017 |
| | | | | 705/14.64 |
| 2008/0147558 | A1* | 6/2008 | Kraus | G06F 21/10 |
| | | | | 705/59 |
| 2009/0083260 | A1* | 3/2009 | Artom | G06F 17/30817 |
| 2009/0233632 | A1* | 9/2009 | Yamamoto | H04L 51/063 |
| | | | | 455/466 |
| 2010/0004010 | A1* | 1/2010 | Shin | H04L 51/04 |
| | | | | 455/466 |
| 2010/0115596 | A1* | 5/2010 | Horozov | G06F 21/10 |
| | | | | 726/7 |
| 2011/0035264 | A1* | 2/2011 | Zaloom | G06Q 10/10 |
| | | | | 705/14.12 |
| 2012/0017150 | A1* | 1/2012 | Pollack | G11B 27/034 |
| | | | | 715/716 |
| 2012/0155834 | A1* | 6/2012 | Beacham | H04N 21/4334 |
| | | | | 386/241 |
| 2013/0018960 | A1* | 1/2013 | Knysz | G06Q 50/01 |
| | | | | 709/204 |
| 2013/0337779 | A1* | 12/2013 | Tang | H04L 51/066 |
| | | | | 455/412.1 |
| 2014/0324885 | A1* | 10/2014 | McKenzie | G06F 17/30268 |
| | | | | 707/748 |
| 2015/0319119 | A1* | 11/2015 | Ryu | H04L 51/10 |
| | | | | 715/752 |
| 2016/0132292 | A1* | 5/2016 | Jeoung | H04M 1/7255 |
| | | | | 715/727 |
| 2016/0259497 | A1* | 9/2016 | Foss | G06F 3/0482 |
| 2016/0291824 | A1* | 10/2016 | Grossman | H04L 51/066 |
| 2017/0257676 | A1* | 9/2017 | Rasanen | H04N 5/44591 |
| 2017/0311039 | A1* | 10/2017 | Zuo | H04N 21/2668 |
| 2017/0344616 | A1* | 11/2017 | Deguchi | H04H 60/64 |
| 2018/0060952 | A1* | 3/2018 | Ruud | G06Q 50/26 |

FOREIGN PATENT DOCUMENTS

| | | |
|---|---|---|
| KR | 1020100004754 A | 1/2010 |
| KR | 1020130025277 A | 3/2013 |
| KR | 1020130046752 A | 5/2013 |

OTHER PUBLICATIONS

International Search Report; dated Aug. 27, 2014 for PCT Application No. PCT/KR2014/004942.

* cited by examiner

METHOD FOR CONTROLLING VOICE EMOTICON IN PORTABLE TERMINAL

TECHNICAL FIELD

The present invention generally relates to a portable terminal control method. More particularly, the present invention relates to a method for controlling a voice emoticon of a portable terminal in which, instead of a common emoticon, a voice set by a user is delivered to a receiver's portable terminal and played therein.

BACKGROUND ART

Emoticons represent users' feeling in the form of text or images, and currently, emoticons may have the form of a flash image or a movie. These emoticons are basically used in an environment in which a sender and a receiver transmit and receive text, and are mainly used for expressing the feeling of the communicators, rather than for the delivery of information.

Figure 1:
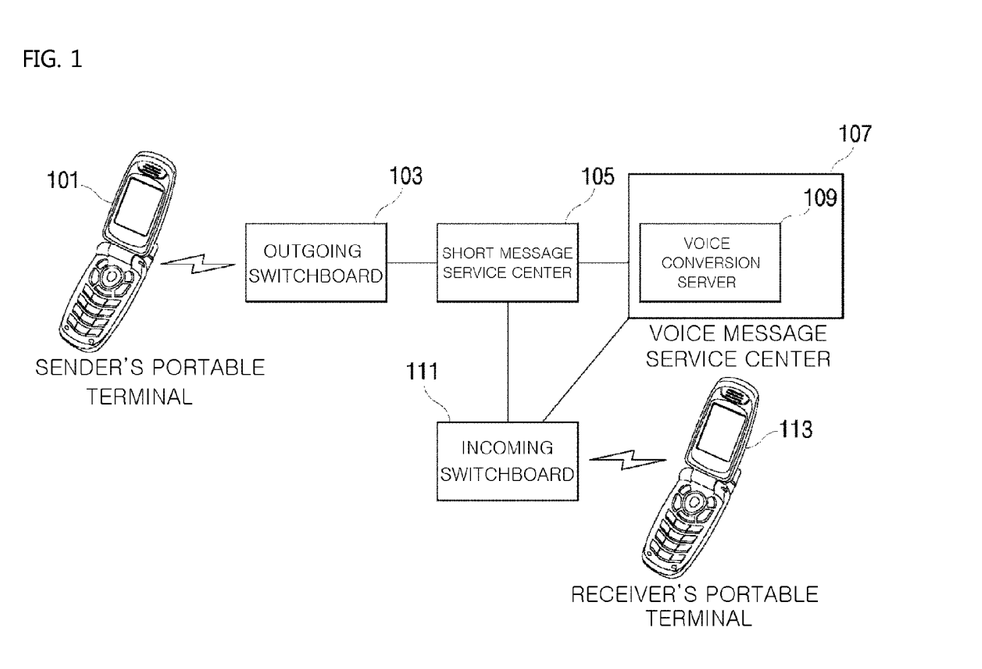
FIG. 1 illustrates a concept diagram for Korean Patent Application Publication No. 10-2005-0048035.

These emoticons are generated based on text or images, and are provided to the portable terminal of a receiver, but the feeling of the user may be expressed not only using an image format but also as a voice or sound. Accordingly, Korean Patent Application Publication No. 10-2005-0048035 has disclosed an emotion-sound service method in which, when text input from a sender's portable terminal is received, a voice message corresponding to the received text is provided to a receiver's portable terminal. FIG. 1 is a concept diagram for Korean Patent Application Publication No. 10-2005-0048035. Referring to FIG. 1, Korean Patent Application Publication No. 10-2005-0048035 provides a receiver's portable terminal with a voice signal for text that has been set in advance between a sender's portable terminal and the emotion-sound system (comprising a voice message center, a voice conversion server, and the like) and with a voice uttered by a Text-To-Speech (TTS) function, thus having limited ability to express the emotion and feeling of the sender.

DISCLOSURE

Technical Problem

An object of the present invention is to provide a method for controlling a voice emoticon in a portable terminal, in which voice-based emoticons capable of expressing various tones and emotions are provided to a receiver's portable terminal and played therein, whereby the voice-based emoticons, which differ according to the emotion and feeling of a user, may be provided in place of emoticons, which are based on text or images.

Technical Solution

According to the present invention, the above object may be accomplished by a step for displaying a voice emoticon call menu for calling a voice emoticon menu in one area of a touch screen, a step for displaying the voice emoticon menu, which includes a voice emoticon list, when the voice emoticon call menu is selected by a user, and a step for transmitting a voice emoticon, selected by the user from the voice emoticon list, to a receiver's portable terminal in place of the voice of the user.

Advantageous Effects

According to the present invention, various voices according to the feeling and emotions of a user may be provided to a receiver's portable terminal to be played in place of text-based emoticons, whereby feelings may be expressed satisfactorily, in comparison with a monotonous and dry voice based on an existing TTS function.

BEST MODE

A portable terminal mentioned herein may mean a device that has a touch screen and is capable of voice communication and data communication. Currently, such a device may include a mobile phone, a smart phone, a laptop computer, a tablet PC, and a Personal Digital Assistant (PDA), but any device that has a touch screen and is capable of voice communication and data communication may be referred to as a portable terminal, besides the above-mentioned devices.

In this specification, portable terminals are classified into a sender's portable terminal and a receiver's portable terminal. However, the sender's portable terminal and the receiver's portable terminal are distinguished depending on which portable terminal transmits a voice emoticon, and the roles of the two portable terminals may be reversed with each other.

Because the description of the operations and roles of the sender's portable terminal in this specification is the same as the process in which a receiver's portable terminal generates and edits a voice talk file or a voice emoticon and transmits it to the sender's portable terminal, the operations will be described mainly with reference to the sender's portable terminal, and the description of the receiver's portable terminal may be omitted.

An app mentioned herein is a program installed and executed in a portable terminal. Generally, it may mean a program installed in a smart phone.

A method for controlling a voice talk of a portable terminal in this specification may be implemented by an app installed in a portable terminal, a system program installed in a portable terminal, or a program installed in a terminal such as a personal computer. Also, transmission, reception, and playback of a voice talk file may be implemented by heterogeneous communication programs that include program modules provided by a consistent Software Development Kit (SDK). This specification mostly describes a voice emoticon control method using an app that is installed in a portable terminal, but the method is not limited to the implementation using an app. Also, it is to be noted that the present invention is not necessarily implemented only by an app.

Hereinafter, the present invention is described in detail with reference to the drawings.

Figure 2:
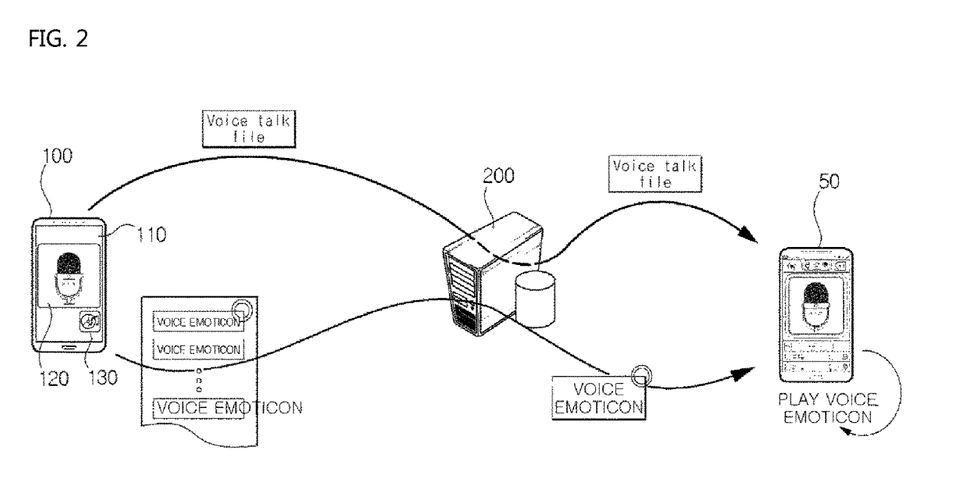
FIG. 2 illustrates a schematic concept diagram for a method for controlling a voice emoticon of a portable terminal according to an embodiment of the present invention.

FIG. 2 illustrates a schematic diagram of a method for controlling a voice emoticon of a portable terminal according to an embodiment of the present invention.

Referring to FIG. 2, in a method for controlling a voice emoticon of a portable terminal according to an embodiment (hereinafter, referred to as "an emoticon control method"), when a selection code, which corresponds to a voice emoticon selected by a user from among voice emoticons listed in a sender's portable terminal 100, is transmitted to a voice talk server 200, the voice talk server 200 transmits the voice emoticon corresponding to the selection code to the receiver's portable terminal 50 to be stored and played therein, whereby the user of the receiver's portable terminal 50 may hear the voice emoticon selected by the sender's portable terminal 100.

Here, the voice talk server 200 may be a service server that enables the sender's portable terminal 100 and the receiver's portable terminal 50 to transmit and receive a text message or a voice message. The voice talk server 200 may contain voice emoticons in the form of a file, and the list of the voice emoticons may be provided to the sender's portable terminal 100. Accordingly, the user of the sender's portable terminal 100 may select a desired voice emoticon from the list, and a selection code for the voice emoticon, selected by the user of the sender's portable terminal 100, may be stored in the sender's portable terminal 100. In other words, a voice emoticon in the form of a file is stored only in the voice talk server 200, and the sender's portable terminal 100 may store only a selection code for selecting the voice emoticon in the form of a file.

Meanwhile, the voice emoticon according to the present invention is not limited to the case in which the voice emoticon is used alone, but may also be used when the sender's portable terminal 100 and the receiver's portable terminal 50 send and receive a text message or when the sender's portable terminal 100 and the receiver's portable terminal 50 send and receive a voice talk file.

Here, the voice talk file is conceptually different from the voice message of the type commonly used in portable terminals. The voice talk file mentioned in the present invention is a voice message in the form of a file that is generated to be sent and received between the sender's portable terminal 100 and the receiver's portable terminal 50, and this voice message is referred to as a voice talk file.

For example, when a voice talk file is transmitted from the sender's portable terminal 100 to the receiver's portable terminal 50 in the present invention, the voice talk file is a voice file that contains the actual voice of the sender. In other words, the sender's portable terminal 100 and the receiver's portable terminal 50 may send and receive a voice talk file reciprocally, and in order to send and receive a voice message, which is transmitted in the form of a file, the sender's portable terminal 100 and the receiver's portable terminal may alternately transmit the voice talk file to the opposite party's portable terminal, like walkie-talkies.

In this case, a voice emoticon may be used when it is difficult for the sender's portable terminal 100 to transmit a voice talk file to the receiver's portable terminal 50, or when the user of the sender's portable terminal 100 provides the receiver's portable terminal 50 with a special voice message having a particular tone for expressing his or her feeling.

For example, when either the user of the sender's portable terminal 100 or the user of the receiver's portable terminal 50 is in a meeting or is in an environment having a quiet atmosphere, or when it is not appropriate to have a voice-based conversation, it is difficult for the sender to deliver the voice having a vivid emotion and feeling to the receiver's portable terminal 50. Because a voice emoticon may be selected by the sender in the sender's portable terminal 100 and transmitted to the receiver's portable terminal 50, the sender need not talk in order to participate in a voice-based conversation. Also, as distinct from a voice talk file transmitted to the receiver's portable terminal 50, various types of voice emoticons may be transmitted to the receiver's portable terminal 50, instead of the sender's voice. For example, the voice emoticon may be:

1) generated using the voice of an actor or actress, the voice of a voiceover actor, or the voice of an entertainer,
2) generated using voice modulation to mimic a boss's way of talking, a bully's way of talking, an employee's way of talking, or a talking style according to various occupations,
3) generated using the voice of an entertainer or voiceover actor to mimic a talking style according to a specific occupation, rather than using voice modulation, or
4) generated by the user of the sender's portable terminal 100 using his or her voice or the voice of another person in the vicinity of the user.

As described above, a voice emoticon may be generated by various methods, and the generated voice emoticon may be registered and stored in the voice talk server 200. Here, if the voice emoticon is generated using the voice of an entertainer or voiceover actor, it may be difficult for individuals to legally acquire the voice emoticon containing the voice of the entertainer or voiceover actor.

The voice talk server 200 may provide the sender's portable terminal 100 or the receiver's portable terminal 50 with a voice emoticon using the voice of an entertainer or voiceover actor, in which case the fee for using the voice of the entertainer or voiceover actor may be charged to the sender's portable terminal 100 or the receiver's portable terminal 50. The fee may be charged whenever the voice of an entertainer or voiceover actor is downloaded from the voice talk server 200. For example, whenever the voice of the entertainer or voiceover actor is provided to the receiver's terminal 50 in response to the request from the sender's portable terminal 100, the fee may be charged to the sender's portable terminal 100.

The method for controlling a voice emoticon of a portable terminal according to an embodiment may be processed based on a voice talk service. As described above, the voice emoticon may be used together with a voice talk file or a text-based message in an environment in which the sender's portable terminal 100 and the receiver's portable terminal 50 reciprocally send and receive voice talk files or text-based messages. In this case, the sender's portable terminal 100 and the receiver's portable terminal 50 are required to execute a voice talk menu for transmitting and receiving a voice message using a voice talk file.

The voice talk menu is described with reference to FIG. 3.

Figure 3:
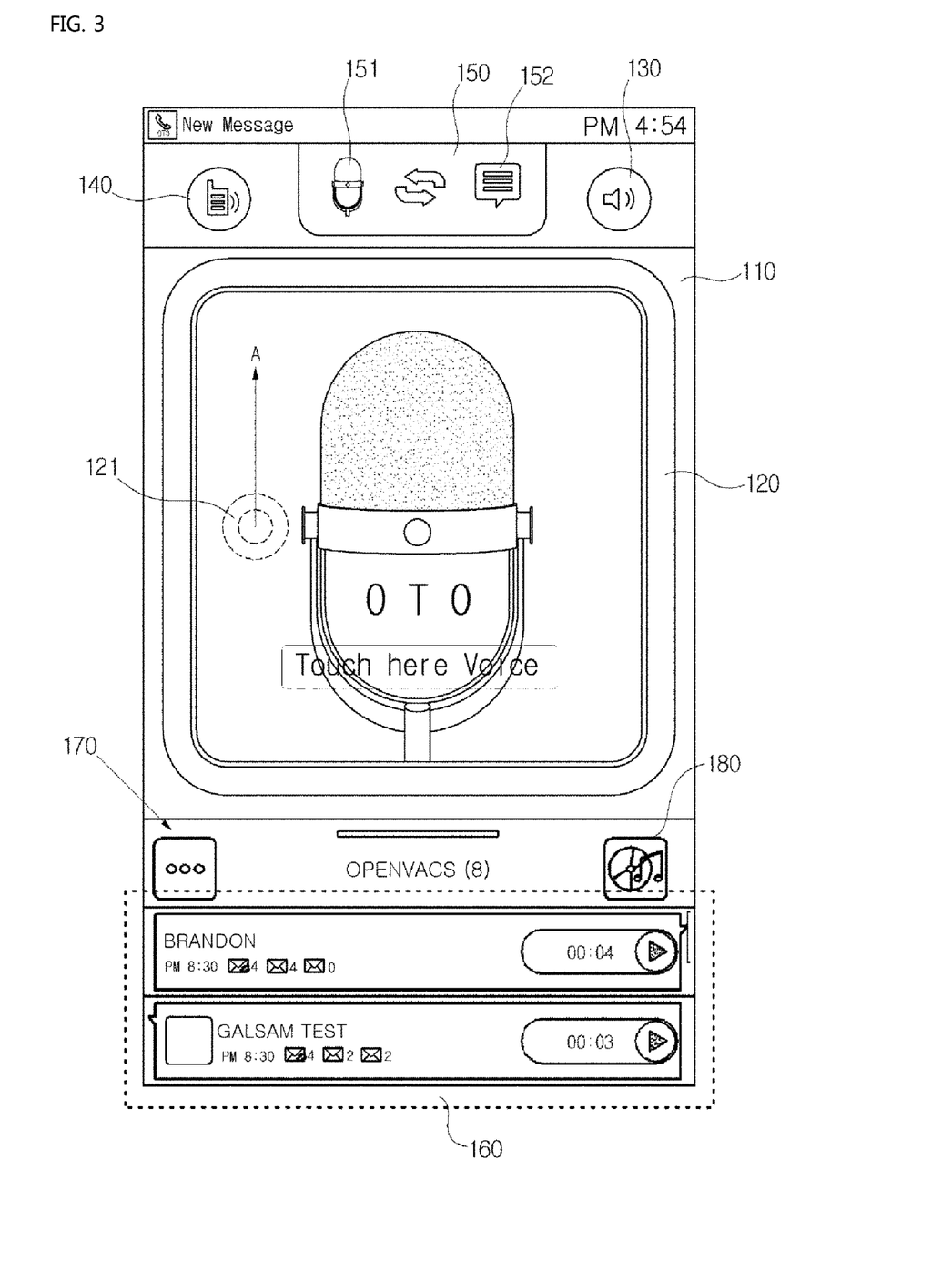
FIG. 3 illustrates a reference view for an example of a voice talk menu.

FIG. 3 illustrates a reference view for an example of the voice talk menu.

Referring to FIG. 3, a voice talk menu according to an embodiment may be configured to include a voice input area 120, a speaker on-off menu item 130, a real-time play menu item 140, a mode conversion menu item 150, a voice mailbox menu item 160, and a popup menu item 170.

The voice input area 120 is the item occupying the widest area in a touch screen 110, and may occupy an area that ranges from ½ to ¾ of the touch area of the touch screen 110. Alternatively, icons for some menu items are arranged to one side of the touch screen 110, and most of the touch area may be formed as the voice input area 120. Also, it is possible to arrange the voice input area 120 in the entire touch area of the touch screen 110 and to display a menu related to a voice talk service on the touch screen 110 using a button key (not illustrated) provided on the sender's portable terminal 100. Here, the button key may be a menu key, a home key, or an end key. However, according to the portable terminal model, there may be only one or two button keys, or there may be no button key. In such cases, one of the keys that are provided on the portable terminal but may not express an image may be used as the button key. However, the button key is not limited to this example.

The app may record the voice of a user when touch input occurs in the voice input area 120, and may finish recording of the voice of the user when the user lifts the touch.

Meanwhile, the app may stop the generation of the voice talk file when drag input occurs in the direction of A from the position 121 at which the user first touches the voice input area 120. When drag input occurs in the direction of A or in the direction diametrically opposite to A, the app may not generate a voice talk file even if the voice input area 120 is touched.

Reference numeral "130" indicates a speaker on-off menu item, and may set whether to play a voice talk file using a speaker (not illustrated) arranged in the receiver's portable terminal 50 or an earphone (or headphones) connected to the receiver's portable terminal 50 when the receiver's portable terminal 50 plays the voice talk file.

Reference numeral "140" corresponds to an automatic play menu item that enables a voice talk file, transmitted from the sender's portable terminal 100 to the receiver's portable terminal 50, to be automatically played in real time.

Here, when the app is running, the receiver's portable terminal may play the voice talk file, transmitted from the sender's portable terminal 100, in real time. Conversely, if the receiver's portable terminal 50 receives a voice talk file when the app installed in the receiver's portable terminal 50 is not running, the receiver's portable terminal 50 may display an alarm message informing the user of the reception of the voice talk file. In this case, the user of the receiver's portable terminal 50 selects and checks the alarm message displayed on the touch screen 110 by touching it, and needs to play the voice talk file using a separate player program. In this case, the receiver's portable terminal 50 is capable only of receiving and playing the voice talk file, whereas in order to transmit a voice talk file from the receiver's portable terminal 50 to the sender's portable terminal 100, the receiver's portable terminal 50 is required to execute an app that serves to transmit and receive a voice talk file. Here, the alarm message transmitted to the receiver's portable terminal 50 may be a push message provided by the voice talk server 200.

Reference numeral "150" indicates a mode conversion menu item for switching between a voice talk mode and a text message mode, and reference numerals "151" and "152" indicate icons respectively corresponding to the voice talk mode and the text message mode.

Reference numeral "160" indicates a voice mailbox menu item, and serves to show a voice talk file sent and received between the sender's portable terminal 100 and the receiver's portable terminal 50. The voice mailbox menu item is registered in the sender's portable terminal 100 or the receiver's portable terminal 50, and may be called by the user of the sender's portable terminal 100 or the user of the receiver's portable terminal 50 to play the voice talk file.

Reference numeral "170" indicates a popup menu item, and when it is touched by a user, a receiver group setting menu for setting a receiver group with whom to communicate using the voice talk may be displayed on the touch screen 110.

Reference numeral "180" indicates a voice emoticon call menu item, and may be used in an environment in which the voice talk menu illustrated in FIG. 3 is executed in the sender's portable terminal 100.

The voice emoticon call menu item 179 is arranged to enable the user of the sender's portable terminal 100 to send a voice emoticon as a substitute for his or her voice to the receiver's portable terminal 50 when the sender's portable terminal 100 transmits a voice talk file to the receiver's portable terminal 50 using the voice talk menu.

The voice emoticon may be a voice emoticon registered by the sender's portable terminal 100, selected from among the voice recorded by the user of the sender's portable terminal 100 and registered in the voice talk server 200, a recording made by another person and registered in the voice talk server 200, the voice of the user or another person, which has been modulated and then registered in the voice talk server 200, and the voice of an entertainer or voiceover actor, which has been registered in the voice talk server 200 provided by the present applicant. In this case, the sender's portable terminal 100 stores only a selection code for acquiring the voice emoticon, and the actual voice emoticon in the form of a file may be stored on the voice talk server 200.

Figure 4:
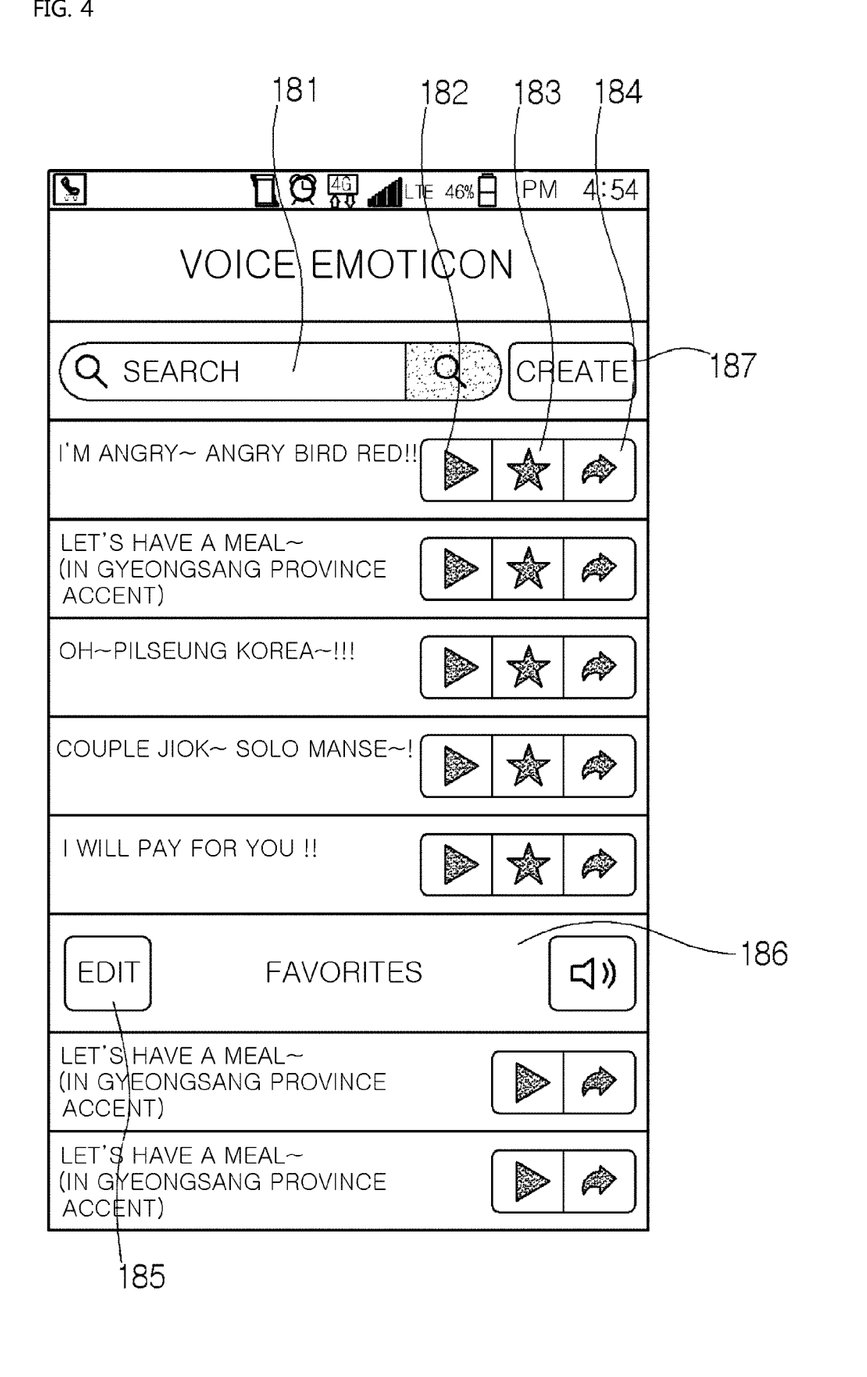
FIGS. 4 to 6 illustrate reference views for an example of the submenu of the voice emoticon menu illustrated in FIG. 3, which will be described hereinafter with reference to FIGS. 4 to 8.
Figure 5:
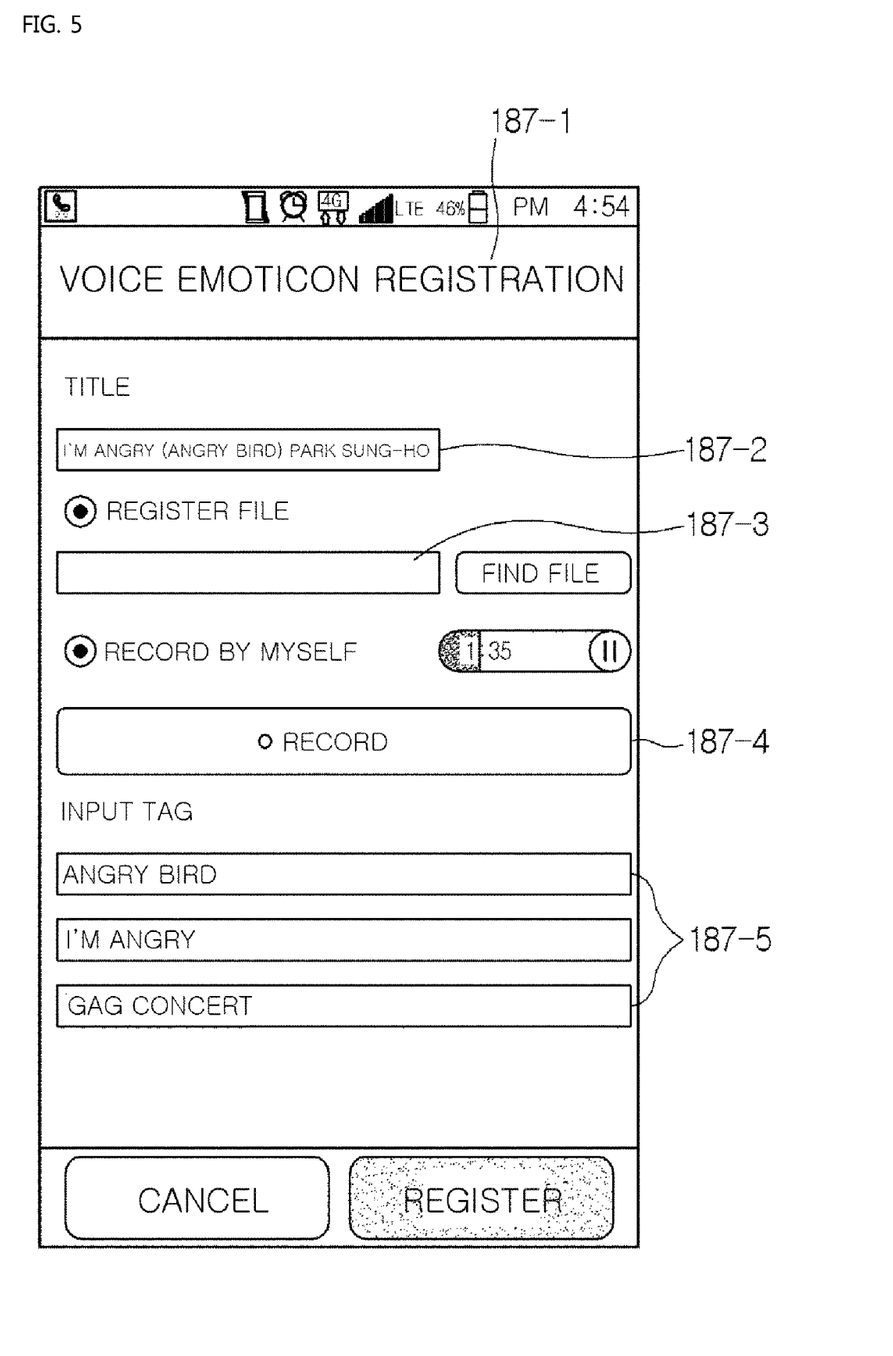
Figure 6:
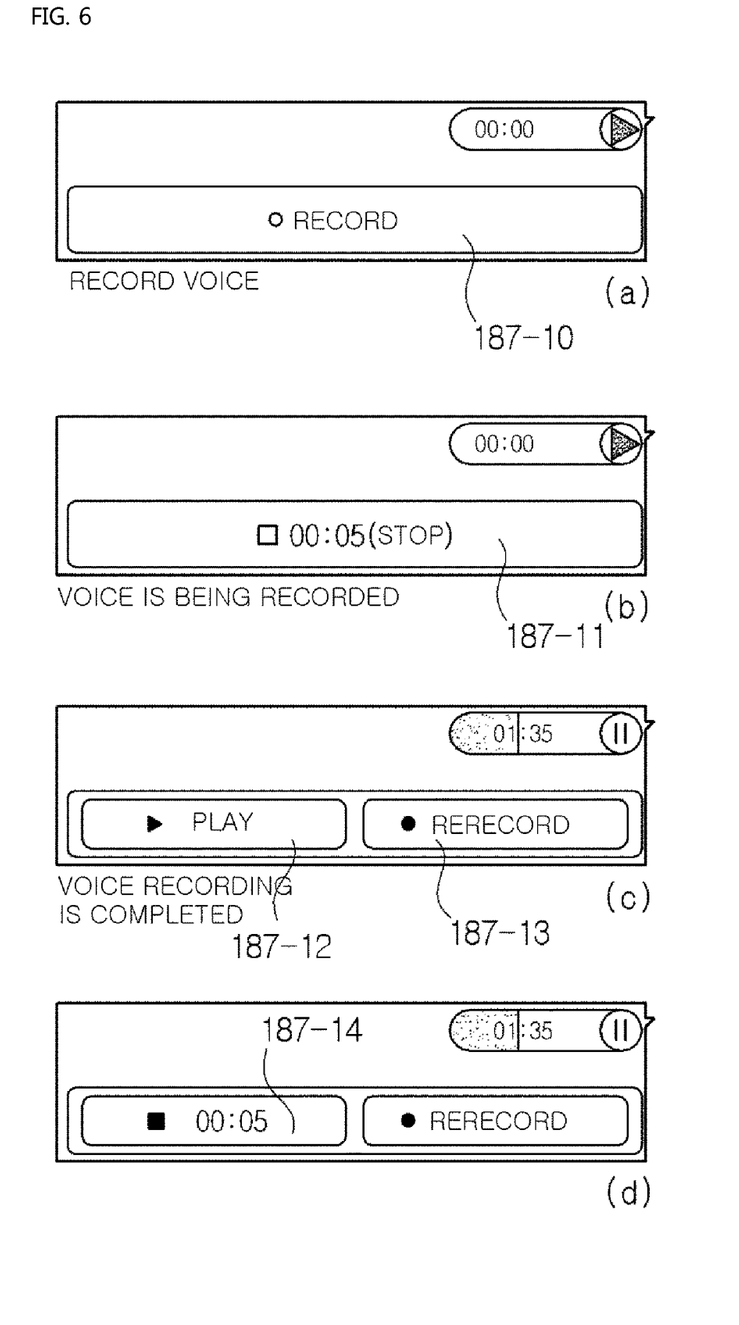

FIGS. 4 to 6 illustrate reference views for an example of the voice emoticon menu and the submenu thereof, illustrated in FIG. 3. Hereinafter, a description will be provided with reference to FIGS. 4 to 6.

First, FIG. 4 shows a voice emoticon menu 180 that is displayed when the voice emoticon call menu item 179 illustrated in FIG. 3 is selected by a user, and may be configured to include a search text field 181, a play button 182, a bookmark button 183, a transmission button 184, a favorites list 186, an edit button 185, and a creation button 187.

In the illustrated voice emoticon menu 180, the search text field 181 may be arranged to enable searching for a voice emoticon registered in the voice talk server 200. The voice emoticon may be represented as text to which tag information is added, as illustrated in FIG. 4. For example, the voice emoticon may be represented in text form, such as "I'm angry~Angry bird red!!", "Let's have a meal~(in a Gyeongsang province accent)", and "Oh~Pilseung Korea" in FIG. 4. The voice emoticon represented in text form may include a play button 182, a bookmark button 183, and a transmission button 184 of its own, and the user of the sender's portable terminal 100 may transmit the voice emoticon by selecting the voice emoticon to be transmitted to the receiver's portable terminal 50 and by touching the transmission button 184, which is disposed in the same row as the selected voice emoticon.

Also, if the user of the sender's portable terminal 100 wants to bookmark a frequently used voice emoticon, the user may add a desired voice emoticon, selected from among the voice emoticons represented in text form, in the favorites list 186. In the favorites list 186, a selection code for the voice emoticon may be registered.

FIG. 4 exemplifies the case in which the voice emoticon, "Let's have a meal (in a Gyeongsang province accent)", is registered in the favorites list 186.

The creation button 187 is arranged to enable the user of the sender's portable terminal 100 to create a voice emoticon by recording his or her voice or the voice of another person. If the user of the sender's portable terminal 100 selects the creation button 187 by touching it, a registration interface for recording and registering the voice may be displayed on the touch screen 110. The registration interface displayed on the touch screen 100 will be described with reference to FIG. 5.

FIG. 5 illustrates a reference view showing an example of the registration interface for recording and registering a voice defined by a user.

Referring to FIG. 5, the illustrated registration interface may be configured to include a title input text field 187-2, a file registration menu 187-3, a recording button 187-4, and tag information input text fields 187-5. The title input text field 187-2 is a text field in which text to be displayed in the voice emoticon list is input, and a title that may be easily understood and found by the user of the sender's portable terminal 100 may be assigned, such as "I'm angry (angry bird) Park sung-ho" in the drawing. The file registration menu 187-3 may be arranged to register a voice file generated by the sender's portable terminal 100 in the voice talk server 200.

The sender's portable terminal 100 may store selection codes for multiple voice files and music files. A selection code is a code corresponding to a voice emoticon registered in the voice talk server 200, and may be implemented as a combination of digits, characters, and special characters, or may be implemented using an ASCII value or a binary value. The present invention is characterized in that only a voice emoticon, which is not a type of file, is stored in the sender's portable terminal 100 or the receiver's portable terminal in order to avoid wasting the storage space on the sender's portable terminal 100 or the receiver's portable terminal 50, whereas the voice emoticon in the form of a file is stored on the voice talk server 200 and a selection code is used to select the voice emoticon stored on the voice talk server 200.

The recording button 187-4 is arranged to enable the user of the sender's portable terminal 100 to record his or her voice or the voice of another person in the vicinity of the user. The voice, recorded using the recording button 187-4, may be transmitted to the voice talk server 200, the voice in the form of a file may be registered in the voice talk server 200, and a selection code for the voice in the form of a file may be provided to the sender's portable terminal 100 after the registration.

The tag information input text fields 187-5 are used to enable the user of the sender's portable terminal 100 to input tag information, which is added to a voice emoticon for the convenience of search and retrieval of the voice emoticon. The tag information may use a word included in the title assigned to the voice emoticon, or a category name as desired by the user. Here, the categories may have types such as meals, relaxation, and standard responses.

Next, FIG. 6 illustrates a reference view for an example of an interface displayed on the touch screen 110 when the recording button 187-4 illustrated in FIG. 5 is selected by a user.

Referring to FIG. 6, when the recording button 187-4 is selected by a user, an interface including a recording button 187-10 may be displayed on the touch screen 110, as illustrated in (a) of FIG. 6. When the user of the sender's portable terminal 100 selects the recording button 187-10 by generating touch input thereto, the app installed in the sender's portable terminal 100 may start to record the voice of the user or the voice of another person in the vicinity of the user, as illustrated in (b) of FIG. 6. In this case, the recording button 187-10 may change to a stop button 187-11. Next, the user of the sender's portable terminal 100 may finish the voice recording by selecting the stop button 187-11, and the interface in this case may be represented as (c) of FIG. 6. Here, whether the voice has been normally recorded may be checked by selecting a pre-listen button 187-12 for the recorded voice. When the pre-listen button 187-12 is selected in (c) of FIG. 6, the pre-listen button 187-12 may change to a stop button 187-14, as illustrated in (d) of FIG. 6. Meanwhile, when the user of the sender's portable terminal 100 is not satisfied with the recorded voice after recording the voice, the user may select a rerecord button 187-13 arranged in (c) of FIG. 6. When the rerecord button 187-13 is selected by the user, the interface shown in (a) of FIG. 6 may be displayed on the touch screen 110.

FIGS. 7 to 10 illustrate flowcharts for a method for controlling a voice emoticon of a portable terminal according to an embodiment of the present invention.

Figure 7:
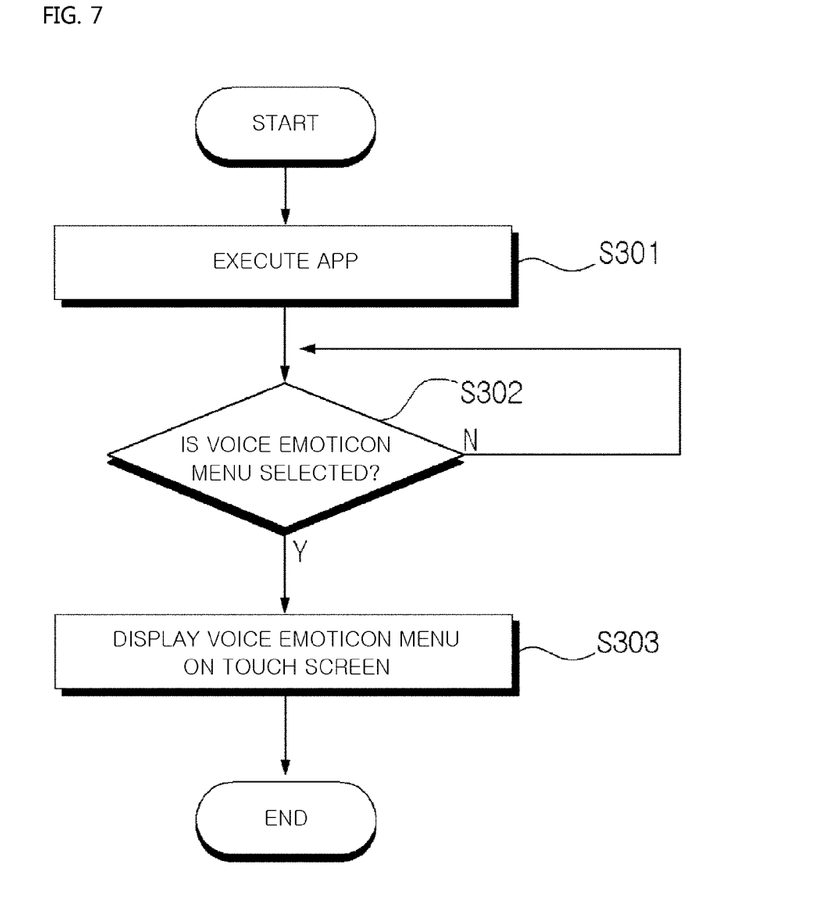
FIGS. 7 to 10 illustrate flowcharts for a method for controlling a voice emoticon of a portable terminal according to an embodiment of the present invention.

First, referring to FIG. 7, the user of the sender's portable terminal 100 may display a voice talk menu on the touch screen by executing an app at step S301.

The voice talk menu displayed on the touch screen 110 may be configured to include a voice input area 120, a speaker on-off menu item 130, a real-time play menu item 140, a mode conversion menu item 150, a voice mailbox menu item 160, and a popup menu item 170, as described with reference to FIG. 3.

Among these menu items, the voice input area 120 may be used to set the recording start time and end time in order to record the voice of the user of the sender's portable terminal 100 during the period from the time at which the user of the sender's portable terminal 100 touches the voice input area to the time at which the user lifts the touch. Using the voice input area 120, it is possible to implement a method in which the sender's portable terminal 100 transmits a voice talk file to the receiver's portable terminal 50 and the receiver's portable terminal 50 transmits a voice talk file to the sender's portable terminal 100 in response to the voice talk file transmitted from the sender's portable terminal 100, that is, a voice-based conversation whereby the sender's portable terminal 100 and the receiver's portable terminal 50 alternately transmit a voice talk file to the opposite party. In this case, if a voice emoticon call menu item 179 is selected, the sender's portable terminal 100 or the receiver's portable terminal 50 may transmit and receive a voice a voice talk file even though the user of the sender's portable terminal 100 or the user of the receiver's portable terminal 50 does not talk.

Next, the app installed in the sender's portable terminal 100 determines whether the voice emoticon call menu item 179 is selected by the user at step S302, and when it is determined that the voice emoticon call menu item 179 is selected by user, the interface of the voice emoticon menu 180, illustrated in FIG. 4, is displayed on the touch screen 110 at step S303.

Figure 8:
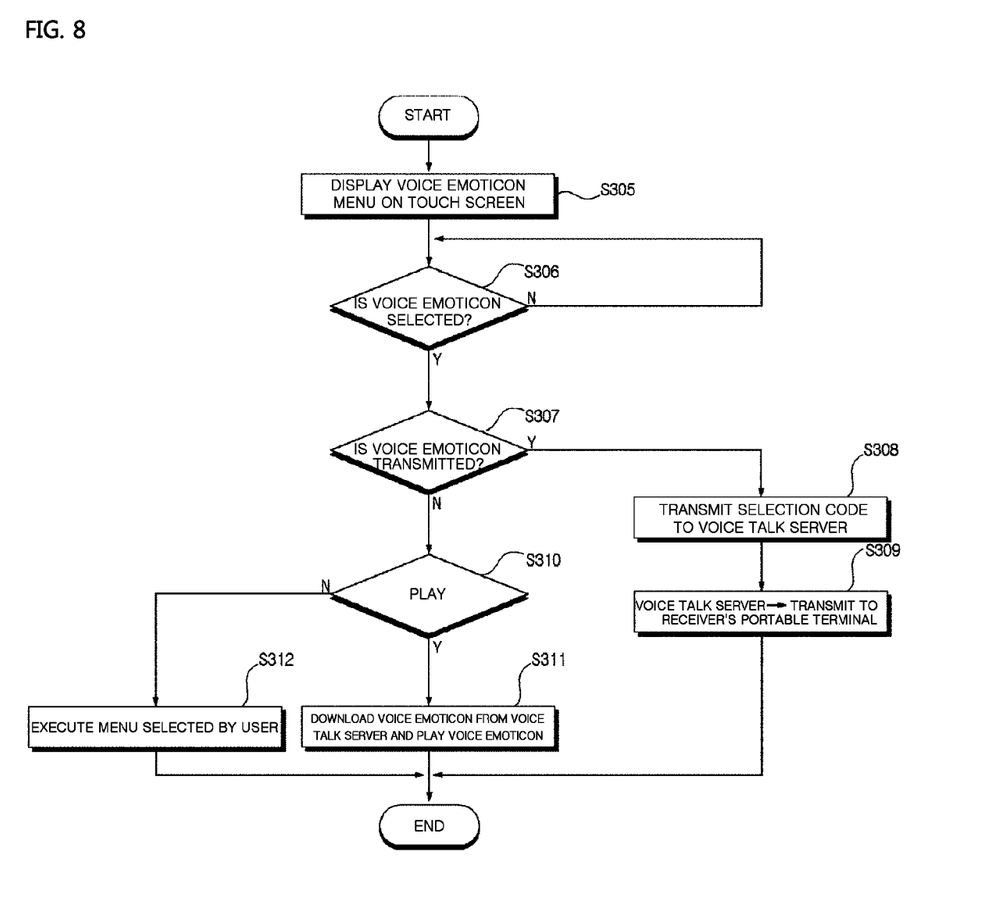

Subsequently, FIG. 8 illustrates a flowchart for a method in which a voice emoticon is retrieved and is then played or transmitted to a receiver's portable terminal. The description of FIG. 7 continues in the description of FIG. 8.

First, the app displays the interface for the voice emoticon menu 180 on the touch screen 110 at step S305, and may determine at step S306 whether a voice emoticon selected by the user exists in the interface for the voice emoticon menu 180 displayed on the touch screen 110.

As a result of the determination, when there is a voice emoticon selected by a user in the voice emoticon menu 180, the app may determine whether a user command has been received for the voice emoticon selected by the user. In this case, the app may determine at step S307 whether a transmission command is generated for the voice emoticon selected by the user. When it is determined that a user command for transmitting the voice emoticon selected by the user to the receiver's portable terminal 50 has been received, the app transmits a selection code for the voice emoticon selected by the user to the voice talk server 200 at step S308, and the voice talk server 200 may transmit the voice emoticon corresponding to the selection code, which was transmitted from the app, to the receiver's portable terminal 50 according to the contact information determined by the app at step S309. Meanwhile, when it is determined that the user command is not a command for transmitting the voice emoticon to the receiver's portable terminal 50 but a command for playing the voice emoticon at step S310, the app may transmit a selection code for the voice emoticon selected by the user to the voice talk server 200, download the voice emoticon corresponding to the selection code from the voice talk server 200, and play the voice emoticon at step S311. When a command for playing the voice emoticon selected by the user is not generated, the app may operate in response to the selection of another menu item by the user at step S312.

Figure 9:
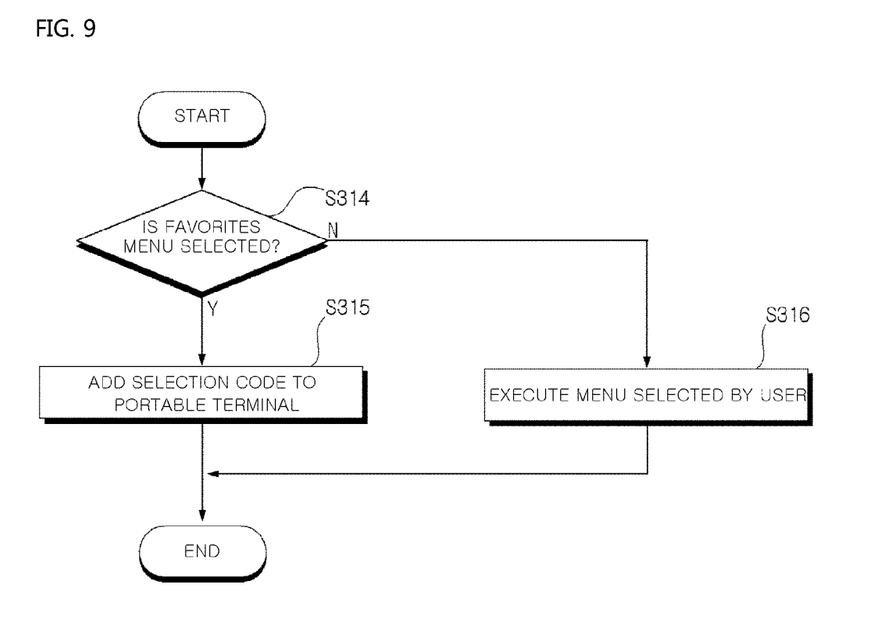

Next, FIG. 9 illustrates a flowchart for an example of a method in which a voice emoticon is registered in the favorites list by the app. The description of FIG. 9 continues from the description of FIG. 7.

First, the app may determine at step S314 whether a favorites list 186 is selected on the touch screen that displays the interface in response to the selection of the voice emoticon call menu item 179. The favorites list 186 is arranged for collecting voice emoticons desired by a user, as shown and described in FIG. 4, and the user may register at least one selected from among the voice emoticons listed in the voice emoticon menu 180 through the favorites list 186. In this case, the voice emoticon selected by the user is not downloaded from the voice talk server 200 to the portable terminal 50 or 100, but a selection code corresponding to the voice emoticon registered in the voice talk server 200 is listed in the favorites at step S315.

In other words, what is listed in the favorites list 186 may correspond to a selection code and tag information, and the tag information may be freely defined and input by the user of the app. If the favorites list 186 is not selected by the user, the app may process the function of another menu item selected by the user at step S316.

Figure 10:
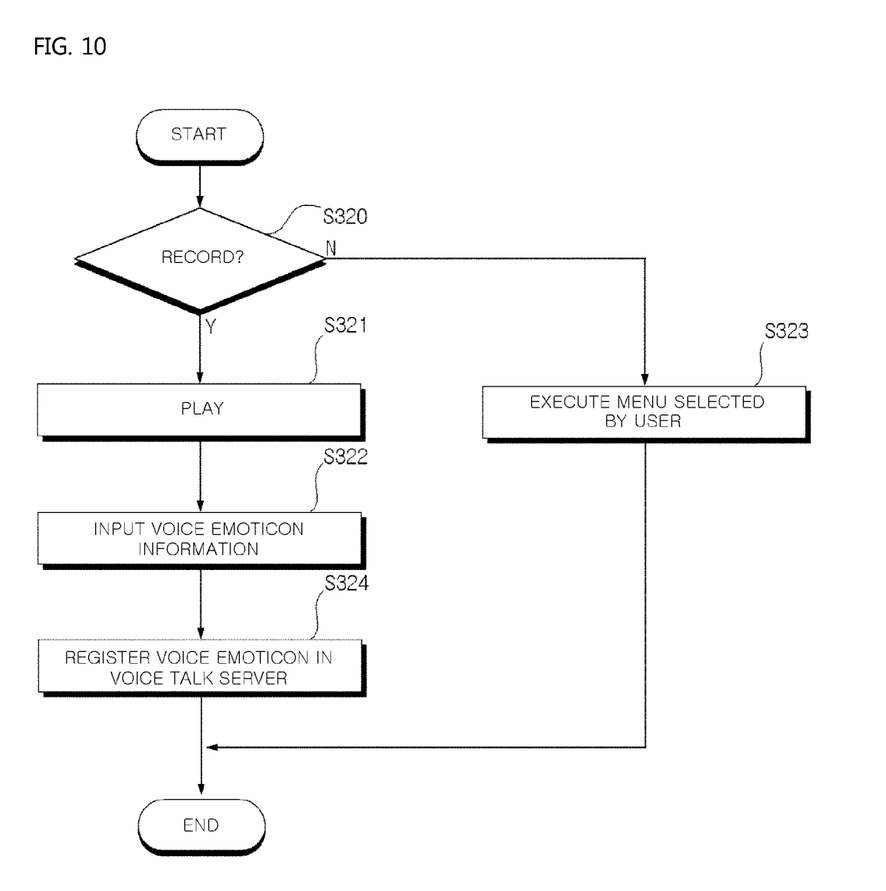

Next, FIG. 10 illustrates a flowchart for an example of a method for registering the voice of a user for a voice emoticon. The description of FIG. 10 continues from the description of FIG. 7.

Referring to FIG. 10, first, the app may determine at step S320 whether the creation button 187 is selected on the touch screen 110 that displays the interface for the voice emoticon menu 180. When it is determined that the creation button 187 is not selected by the user, the app may process the function of another menu item selected by the user at step S323. Conversely, when the creation button 187 is selected by the user, the app may start to record the voice of the user. In this case, the recording of the voice of the user may progress by selecting the recording button 187-4 (with reference to FIG. 5).

The creation button 187 is a menu item for recording the voice of the user of the portable terminal 50 or 100 and registering the recorded voice for a voice emoticon in the voice talk server 200. When the creation button 187 on the touch screen 110 is selected by being touched by the user, the app plays the user's voice recorded by the creation button 187 at step S321 to enable the user to listen to it. If the user of the portable terminal 50 or 100 wants to register the voice for a voice emoticon after listening to it, the app displays the interface for inputting tag information (with reference to FIG. 5) on the touch screen 110, and may receive the tag information, input from the user of the portable terminal 50 or 100, at step S322. When the tag information has been completely input, the app transmits a voice file for the voice recorded by the user to the voice talk server 200, and the voice talk server 200 may register the voice file transmitted from the portable terminal 50 or 100 for the voice emoticon at step S324 and transmit a selection code for the registered voice emoticon to the portable terminal 50 or 100.

The invention claimed is:

1. A method for controlling a voice emoticon of a portable terminal, comprising:
    displaying a voice emoticon call menu for calling a voice emoticon menu in one area of a touch screen;
    displaying the voice emoticon menu including a voice emoticon list when the voice emoticon call menu is selected by a user;
    transmitting a voice emoticon, selected by the user from the voice emoticon list, to a portable terminal of a receiver in place of a voice of the user,
    wherein the voice emoticon menu is configured to include at least one voice emoticon item to which tag information for the voice emoticon is added,
    the voice emoticon item comprises a play menu, a bookmark menu, and a transmission menu for transmission to the portable terminal of the receiver,
    the voice emoticon item is sequentially displayed on the touch screen according to an order of a number of selections by the user, and
    the voice emoticon menu further comprises a search menu to search voice emoticon item using the tag information, a favorites menu to register the voice emoticon and a voice emoticon registration menu for registering a user-defined voice emoticon.

2. The method of claim 1, wherein the favorites menu comprises a pre-listen menu for a voice emoticon registered by the user.

3. The method of claim 1, wherein the voice emoticon menu further comprises a user-defined voice emoticon registration menu.

4. The method of claim 1, wherein the voice emoticon registration menu displays a voice talk menu, which generates a voice talk file for the voice of a user when the touch screen is being touched, on the touch screen by calling the voice talk menu.

5. The method of claim 4, wherein the voice talk menu displays a voice input area, corresponding to ½ or a whole of a touch area of the touch screen, on the touch screen, and the voice talk menu is a menu for generating the voice talk file for the voice of the user when the voice input area is touched by the user.

6. The method of claim 5, wherein the voice talk menu registers a voice talk file, generated during a period from a time at which the voice input area is touched to a time at which a touch is lifted from the voice input area, for the voice emoticon.

7. The method of claim 1, wherein the voice emoticon is a voice file in which at least one of the voice of the user, a voice of an additional person, and a voice acquired by modulating the voice of the user or the voice of the additional person is recorded.

\* \* \* \* \*